Nov. 9, 1965   G. S. PINTER   3,216,157
CONCRETE STRUCTURE AND PROCESS FOR MAKING SAME
Filed June 28, 1961   3 Sheets-Sheet 1

GEORGE S. PINTER
INVENTOR.

BY Karl F. Ross
AGENT

Nov. 9, 1965   G. S. PINTER   3,216,157
CONCRETE STRUCTURE AND PROCESS FOR MAKING SAME
Filed June 28, 1961   3 Sheets-Sheet 3

GEORGE S. PINTER
INVENTOR.

BY
AGENT

United States Patent Office 3,216,157
Patented Nov. 9, 1965

3,216,157
CONCRETE STRUCTURE AND PROCESS
FOR MAKING SAME
George S. Pinter, 33 East End Ave., New York, N.Y.
Filed June 28, 1961, Ser. No. 120,259
14 Claims. (Cl. 52—122)

My present invention relates to concrete structures of the type wherein a slab or other elongated member is supported in a generally horizontal position by spaced-apart stays above a base; this application is a continuation-in-part of my copending application Ser. No. 839,675, filed September 14, 1959, now Patent No. 3,066,448.

In my above-cited application I have disclosed a structure comprising a metallic base, composed of parallel beams, and a concrete slab supported above the base by spacing means including a plurality of nuts imbedded in the underside of the slab and a like number of bolts rising from the base in threaded engagement with the respective nuts, this structure permitting an adjustment of the level of the slab above the base preliminary to an immobilization of the slab relative to the base by welding the bolts to the base and the nuts.

An object of my present invention is to provide a simple and convenient process for imbedding hollow and downwardly open inserts, such as the aforementioned nuts, in a concrete slab in such manner that the insert remains accessible from the underside of the slab after the same has been poured around the insert.

Another object of this invention is to provide a process and means for facilitating the positioning of a slab above a base and the leveling of the slab surface prior to consolidating its connection with the base, e.g. by a welding step or through some other bonding operation, in a structure of the general character disclosed in my copending application.

The above objects, and others that will subsequently appear, are realized in accordance with this invention by the casting of the concrete slab in a mold whose bottom has a threaded perforation at the location of each nut or similar insert to be imbedded in the slab, releasably clamping the insert to this bottom plate with the aid of a retaining bolt threadedly engaging this perforation, and subsequently removing the bolt after the concrete has hardened, thereby leaving in the slab a vertical channel which may be used for the insertion of a carrying hook in the transportation of the slab to its position atop the base and through which, if desired, a bonding composition, e.g. a welding powder (such as the one commercially available under the mark "Thermit"), may be introduced for the subsequent consolidation step. Advantageously, in accordance with another feature of my invention, the imbedded insert is formed with a top plate having a threaded aperture, aligned with the perforation of the bottom plate but larger than the latter, which can be engaged by a carrying hook and/or by a suitable threaded leveling rod adapted to position the slab at a selected elevation above its base; if the insert is designed as a nut, as disclosed in my copending application, the stud matingly received therein is preferably made tubular so that the aforementioned leveling rod may be passed therethrough as a temporary brace while the stud is correspondingly adjusted within the nut.

A structure so made, in which the tubular studs need not be attached to the slab until the latter has reached its destination, is particularly easy to transport as the slabs may readily be stacked on flat cars with small relative spacing; this is especially convenient when the slabs are used in the construction of platforms for railroads or municipal rapid-transit systems. Normally, each slab should have four stud-receiving nuts to which a corresponding number of handles can be temporarily secured for safe and easy carrying.

The above and other objects, features and advantages of my present invention will become more fully apparent from the following detailed description of a preferred embodiment, reference being made to the accompanying drawing in which.

Figure 1:
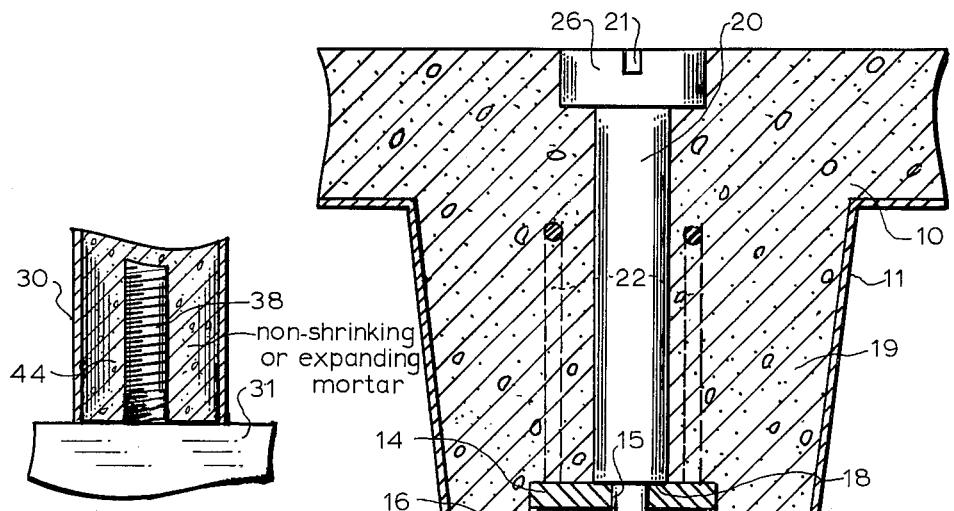
FIG. 1 is a cross-sectional view of part of a mold for making a slab with a downwardly open insert by a process according to the invention.
Figure 2:
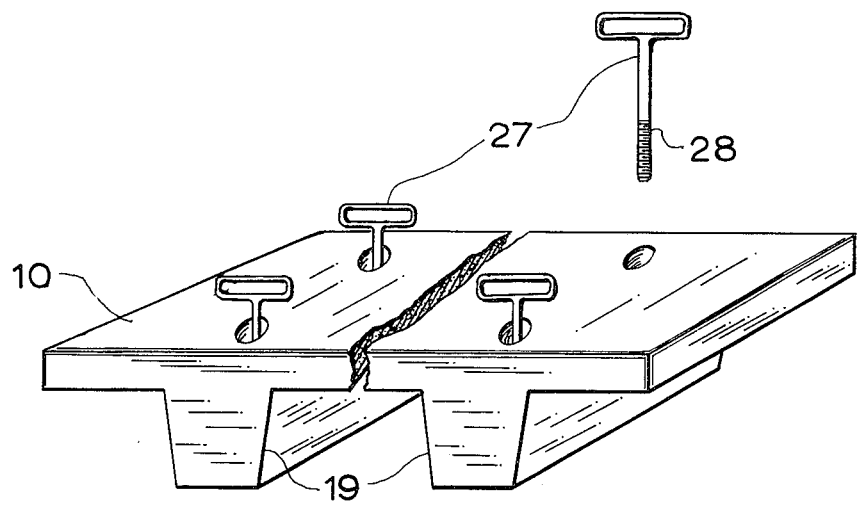
FIG. 2 is a perspective view from above of the completed slab with several carrying handles temporarily attached thereto.
Figure 3:
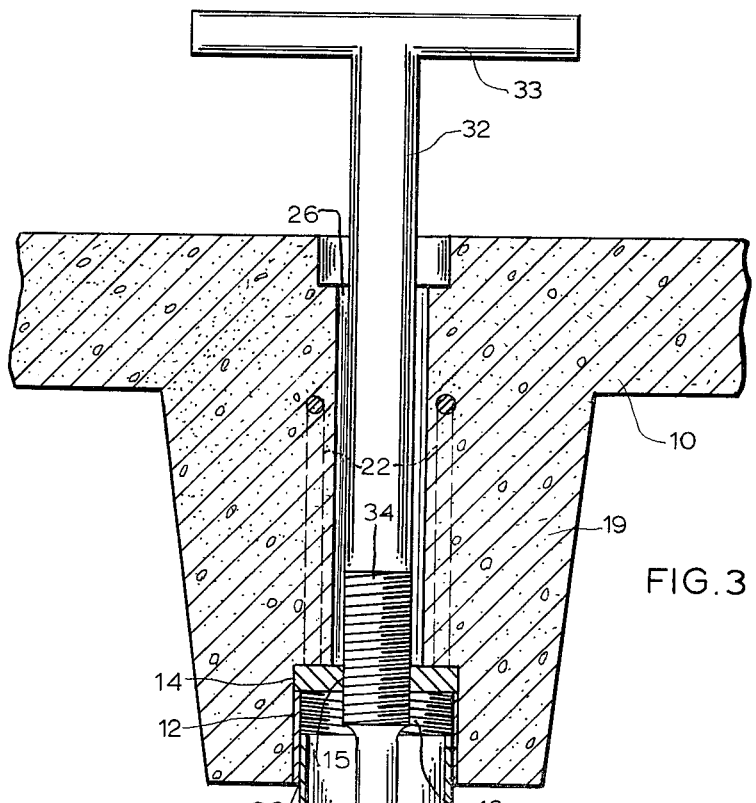
FIG. 3 is a cross-sectional view of the slab portion of FIG. 1 in the process of being positioned above a base with the aid of a tubular stud.
Figure 4:
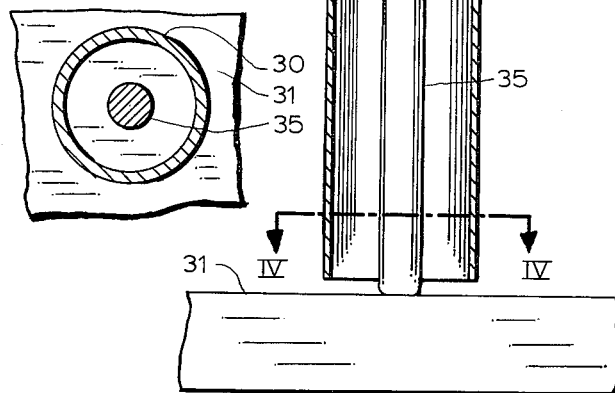
FIG. 4 is a cross-sectional view taken on the line IV—IV of FIG. 3.

In FIG. 1 I show a concrete slab 10 cast in a mold 11 (e.g. of steel) so as to be formed with an integral pedestal 19, two such pedestals being present on the slab as seen in FIG. 2. A tubular metallic insert 12 is imbedded in the concrete and provided with internal threads 16 to serve as a nut adapted to receive a tubular steel stud 30 (FIG. 3), preferably with a loose fit to enable some lateral adjustment of the slab relative to its base as described in my above-identified copending application. The downwardly open nut 12 is partly closed at the top by a cover plate 14, provided with a threaded center hole 15, and rests on a metallic bottom plate 24 having a hole 25 in alignment with the hole 15, the two holes 15, 25 being coaxial with the nut 12. A nut 13 is welded to the underside of plate 24 in such manner that its threaded bore forms a continuation of hole 25 so as effectively to constitute a threaded perforation in plate 24, the diameter of this perforation being less than that of the hole 15 in cover plate 14. Plate 24 forms a partition in the lower part of mold 11, the space below it being partly filled with concrete 23, anchored to plate 24 by stirrups 37, so as to leave a clearance 17 for the nut 13 and the threaded lower extremity of a bolt 20 matingly received therein. Bolt 20 has a shoulder 18 which, upon its threaded insertion into nut 13, bears upon the apertured plate 14 so as to clamp it and the nut 12 tightly against plate 24 during the pouring of the concrete of slab 10 therearound. Plate 14, which is rigid with nut 12, has welded to it a plurality of stirrups 22 to insure a firm anchorage to the concrete of the slab. The slotted head 26 of bolt 20 is flush with or slightly below the upper slab surface so as to be readily accessible from without while enabling the concrete to be freely screeded in the conventional manner; when the concrete has substantially set, a screwdriver is inserted into the slot 21 thereof to withdraw the bolt and to leave a channel 26 as shown in FIG. 3 and to permit the removal of plate 24 and the clearance forming cup 17′ secured thereto upon the removal of form 11 from the slab.

Next, the slab 10 may be transported with the aid of four carrying handles 27, threaded at 28 for mating engagement with the holes 15 of respective inserts 12, 14, as shown in FIG. 2. When the slab has reached its destination, such as a location above a base formed by a pair of steel girders 31 (only one shown) extending transversely to the ribs or pedestals 19, a stud 30 is screwed loosely into each nut 12; it should be noted that these nuts are located at respective intersections between the two pedestals 19 and the two girders 31. Thereupon a bracing rod 32 having a handle 33 is introduced from above into the channel 26 at each of these intersections while being screwed into the hole 15 of cover plate 14 by its threaded shank portion 34; the reduced lower extremity 35 of this rod then exerts pressure upon the base 31 constituted by girders to elevate the slab 10 to the desired level, with the stud 30 preferably hanging loose by its male threads 36 engaging the female threads 16 of nut 12. When the slab has been properly elevated and leveled by simultaneous adjustment at all four parts of support, the respective studs 30 are unscrewed sufficiently to engage the corresponding girders 31 and to relieve the associated rods 32. The latter may now be withdrawn preparatorily to the immobilization of the studs 30 relatively to nuts 12 and girders 31 by interval or external welding.

Figure 9:
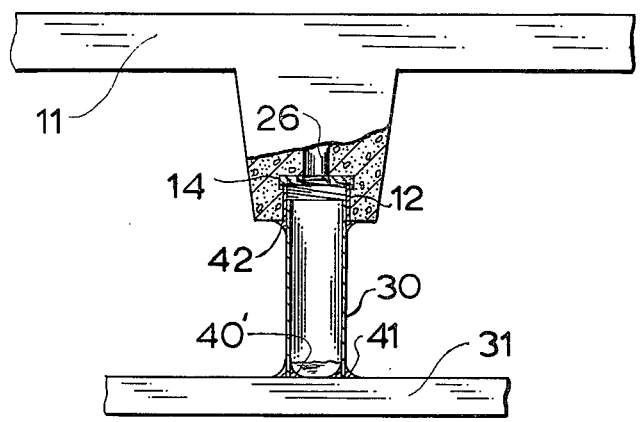
FIG. 9 is a side-elevational view (parts broken away) of a representative portion of the completed structure.
Figure 5:
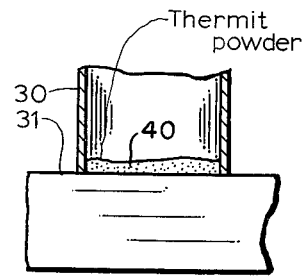
FIG. 5 shows the lower end of the tubular stud in a cross-sectional view similar to FIG. 3 but at a later stage of its installation, ready for internal welding.

For the consolidation of the structure by internal welding at the base I may introduce into the properly positioned tubular member 30, by way of the channel 26, a charge 40 (FIG. 5) of Thermit, i.e. a mixture of iron oxide and comminuted aluminum, which is heated to fusion temperature by suitable means such as a rod electrode inserted through the same channel so as to produce an internal seam 40' (FIG. 9). Channel 26 may also be used for the introduction of other tools, e.g. a boring implement to drill away a protective coating on girder 61 preparatory to welding.

Figure 8:
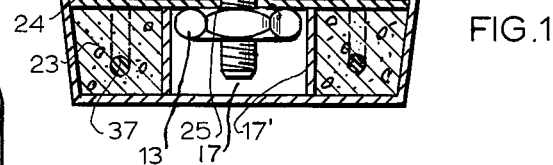
FIGS. 7 and 8 are fragmentary views similar to FIG. 5, illustrating an alternative welding method.
Figure 6:
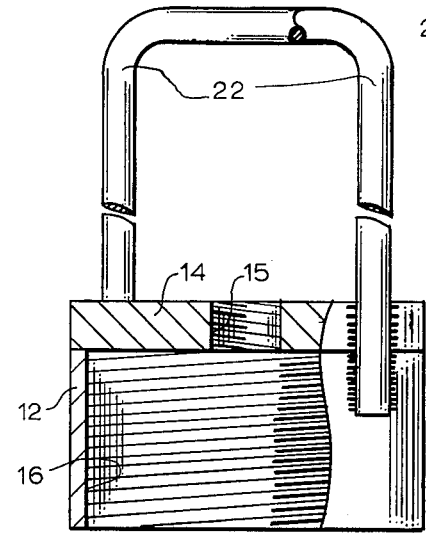
FIG. 6 is a cross-sectional view, drawn to a larger scale, of a nut imbedded in the slab of FIGS. 1–3.
Figure 7:
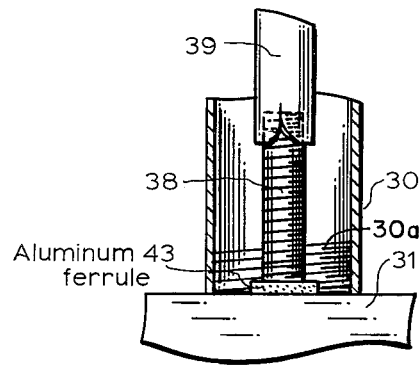

The welding step may also be performed, for example, with the aid of a retaining rod or stud 38 which can be lowered, via channel 26, into the tube 30 with the aid of a suitable holder, such as a resiliently terminated tube 39, to which it is releasably secured as shown in FIG. 7. Rod 38 carries at its lower end a ferrule 43, e.g. of sintered aluminum powder, which is lowered unto the suitably cleaned surface of girder 31 and then heated by a current passed through elements 38, 39 so as to generate enough heat to weld the rod 38 to the girder. The surface of this rod is preferably roughened, e.g. threaded as shown, as is the inner surface of tube 30 which in this instance has been provided with a threaded portion 30a. Next, upon the withdrawal of holder 39, a cementitious mass 44, such as a non-shrinking or expanding mortar, is introduced through channel 26 to anchor the tube 30 to the rod 38 as illustrated in FIG. 8.

FIG. 9 also illustrates an external welding seam 41 between girder 31 and stud 30, as well as a similar seam 42 between the stud and the nut 12. With four studs secured in this manner to the girders 31 and the slab 11, at the locations indicated by the positions of the handles 27 in FIG. 2, the structure is thus completely solidified.

The channel 26 above each stud may, if desired, be left open or else plugged by grouting or other means.

Various modifications of the structural details and operational steps herein disclosed will be readily apparent to persons skilled in the art and are intended to be embraced within the spirit and scope of the invention as defined in the appended claims.

I claim:

1. A process for erecting a structure including a concrete member supported above a base, comprising the steps of imbedding in said slab a generally tubular insert accessible from the underside of said slab and aligned with a channel extending upwardly through said slab, projectingly introducing from below into said insert a tubular stud adapted to support said slab on said base, passing downwardly through said channel and said stud a bracing rod in threaded engagement with said insert, manipulating said rod in pressure-transmitting relationship with said base for positioning said slab at a selected elevation above said base, withdrawing said stud sufficiently from said insert to bring it into contact with said base while maintaining it engaged by said insert, immobilizing said stud relatively to said base and said insert, and removing said rod.

2. A process for erecting a structure including a concrete member supported above a base, comprising the steps of imbedding in said slab a downwardly open nut with an apertured cover plate overlying said nut, projectingly threading from below into said nut a tubular stud adapted to support said slab on said base, forming a channel through said slab above said nut in line with said cover plate thereof, passing downwardly through said channel, said cover plate, said nut and said stud bracing rod in threaded engagement with said cover plate, screwing said rod downwardly into pressure-transmitting relationship with said base until said slab occupies a selected position above said base while lifting said stud off said base, partly unscrewing said stud from said insert until it touches said base, immobilizing said stud relatively to said base and said insert, and removing said rod.

3. A process for erecting a structure including a concrete member supported above a base at a plurality of horizontally spaced locations, comprising the steps of imbedding in said slab at each of said locations a downwardly open nut with an apertured cover plate overlying said nut, projectingly threading from below into each of said nuts a respective tubular stud adapted to support said slab on said base, forming a channel through said slab above each of said nuts in line with the respective cover plate thereof, passing downwardly through said channel, said cover plate, said nut and said stud at each of said locations a respective bracing rod in threaded engagement with said cover plate, screwing each rod downwardly into pressure-transmitting relationship with said base until said slab occupies a selected position above said base at each of said locations while lifting the corresponding stud off said base, partly unscrewing each stud from its insert until it touches said base, immobilizing each stud relatively to said base and its insert, and removing said rods.

4. A process according to claim 3 wherein each of said nuts is imbedded in said slab by being clamped to a bottom portion of a mold for said slab with the aid of a retaining bolt screwed through said apertured cover plate into said bottom portion while bearing upon said cover plate, said channel being formed by the subsequent removal of said bolt upon a substantial hardening of the poured slab.

5. A process according to claim 4 wherein said slab upon hardening is transported to a position above said base with the aid of carrying handles respectively introduced from above through said channel at each of said locations into threaded engagement with the cover plate of the corresponding insert.

6. A process according to claim 3 wherein said base and said stud are metallic, the step of immobilizing each stud relatively to said base including the introduction of a bonding substance into the interior of the stud through the associated channel.

7. A process according to claim 6 wherein said bonding substance is a welding powder.

8. A process according to claim 6 wherein said bonding substance is a cementitious material.

9. A process according to claim 8, comprising the further step of welding a retaining element to said base within said stud prior to introduction of said cementitious material.

10. A structure comprising a concrete slab, a nut imbedded at each of a plurality of horizontally spaced locations, in said slab while being open toward the underside thereof, a substantially horizontal base underneath said slab, a cover plate overlying said nut within said slab, said cover plate being provided with a threaded aperture substantially coaxial with said nut and of a diameter less than the threaded bore of the nut, said slab having a channel at each of said locations extending upwardly through it from said cover plate in alignment with said aperture, and a supporting stud for said slab at each of said locations threadedly received in said nut while resting on said base, said aperture being accessible to a mating tool by way of said channel, said stud being tubular for enabling insertion of a temporary brace through said channel and said stud into pressure-transmitting contact with said base in threaded engagement with said aperture.

11. A structure comprising a concrete slab, a nut imbedded at each of a plurality of horizontally spaced locations in said slab while being open toward the underside thereof, a substantially horizontal base underneath said slab, a cover plate overlying said nut within said slab, said cover plate being provided with a threaded aperture substantially coaxial with said nut and of a diameter less than the threaded bore of the nut, said slab having a channel at each of said locations extending upwardly through it from said cover plate in alignment with said aperture, and a supporting stud for said slab at each of said locations threadedly received in said nut while resting on said base, said aperture being accessible to a mating tool by way of said channel, said base comprising at least one metallic beam, said stud being tubular and internally welded to said beam.

12. A structure comprising a concrete slab, a nut imbedded at each of a plurality of horizontally spaced locations in said slab while being open toward the underside thereof, a substantially horizontal base underneath said slab, a cover plate overlying said nut within said slab, said cover plate being provided with a threaded aperture substantially coaxial with said nut and of a diameter less than the threaded bore of the nut, said slab having a channel at each of said locations extending upwardly through it from said cover plate in alignment with said aperture, and a supporting stud for said slab at each of said locations threadedly received in said nut while resting on said base, said aperture being accessible to a mating tool by way of said channel, said stud being tubular and filled at least in its lower part with a bonding mass securing it to said base.

13. A structure according to claim 12, further comprising a retaining element rising from said base within said tubular stud and imbedded in said bonding mass.

14. A structure according to claim 13 wherein said bonding mass is a cementitious material.

References Cited by the Examiner
UNITED STATES PATENTS

| | | | |
|---|---|---|---|
| 913,875 | 3/09 | Cleverdon et al. | 50—466 X |
| 1,108,859 | 8/14 | Bennett | 50—466 X |
| 1,145,385 | 7/15 | Marble | 50—468 |
| 1,405,372 | 1/22 | White | 50—466 X |
| 1,466,264 | 8/23 | Ambursen | 50—470 X |
| 1,772,708 | 8/30 | Cole | 50—531 |
| 1,801,723 | 4/31 | Clifford | 50—466 X |
| 1,996,358 | 4/35 | Werner | 50—80 |
| 2,057,670 | 10/36 | Crecca et al. | 189—36 |
| 2,063,748 | 12/36 | Olsen | 50—534 |
| 2,137,759 | 11/38 | Martin | 50—186 X |
| 2,218,705 | 10/40 | Faber | 25—154 |
| 2,229,671 | 1/41 | Powers | 50—290 |
| 2,297,923 | 10/42 | Strong et al. | 25—154 |
| 2,309,451 | 1/43 | Hasenburger et al. | 50—80 X |
| 2,466,106 | 4/49 | Hoge | 50—395 |
| 2,616,284 | 11/52 | Leontovich | 50—188 X |
| 2,625,815 | 1/53 | Black | 50—80 |
| 2,690,072 | 9/54 | Reed | 50—188 X |
| 2,987,855 | 6/61 | Singleton et al. | 50—290 |
| 3,066,448 | 12/62 | Pinter | 50—80 |

FOREIGN PATENTS

| | | |
|---|---|---|
| 5,537 | 4/89 | Great Britain. |
| 466,044 | 5/37 | Great Britain. |

OTHER REFERENCES

German application, No. 1,008,897, printed May 23, 1957.

HENRY C. SUTHERLAND, *Primary Examiner.*

WILLIAM I. MUSHAKE, JACOB L. NACKENOFF, BENJAMIN BENDETT, *Examiners.*